United States Patent [19]

Perach

[11] Patent Number: 4,538,645
[45] Date of Patent: Sep. 3, 1985

[54] CONTROL VALVE ASSEMBLY

[75] Inventor: Asi Perach, Wheeling, Ill.

[73] Assignee: Ambac Industries, Inc., Dearborn, Mich.

[21] Appl. No.: 523,909

[22] Filed: Aug. 16, 1983

[51] Int. Cl.³ ............................................. F16K 31/06
[52] U.S. Cl. ............................ 137/625.65; 251/129.15; 251/337
[58] Field of Search ................... 137/625.65; 251/129, 251/141, 337; 335/221

[56] References Cited

U.S. PATENT DOCUMENTS

| | | | |
|---|---|---|---|
| 2,829,860 | 4/1958 | Garner | 251/129 |
| 2,934,090 | 4/1960 | Kenann | 251/129 X |
| 3,406,912 | 10/1968 | Claffey | 251/337 X |
| 3,661,183 | 5/1972 | Komaroff | 137/625.65 |
| 4,050,477 | 9/1977 | Acar | 137/625.65 |
| 4,250,922 | 2/1981 | Will | 251/129 X |
| 4,316,599 | 2/1982 | Bouvet | 251/129 |

FOREIGN PATENT DOCUMENTS

| | | |
|---|---|---|
| 1320014 | 6/1973 | United Kingdom . |
| 2071279 | 9/1981 | United Kingdom . |

*Primary Examiner*—Robert G. Nilson
*Attorney, Agent, or Firm*—Gene D. Fleischhauer

[57] ABSTRACT

A control valve assembly 10 having a pair of axially opposed seats 54, 56 is disclosed. A poppet 66 is disposed in a control chamber 58 between the seats. The poppet is movable between the seats to establish an average pressure in the control chamber. The poppet is an integral portion of an armature 28. In one embodiment, the armature is urged in a first direction by a solenoid and in the opposite direction by a conical spring 76 which extends between the armature and a housing of the valve. In another embodiment, the armature has a spherical zone 94 on a convex surface 92 and a spring guide 84 engages the spring and has a concave surface which engages the spherical zone.

17 Claims, 3 Drawing Figures

CONTROL VALVE ASSEMBLY

DESCRIPTION

1. Technical Field

This invention relates to valves and more particularly to a control valve assembly for providing a controlled pressure or flow to an external device. The invention was developed in the field of electromagnetically operated valves but the teachings herein are applicable to mechanically operated valves which operate at high frequency.

2. Background of the Invention

An example of a valve for controlling differential flows and pressures is shown in U.S. Pat. No. 4,005,733 entitled Pressure Control Valve issued to John W. Riddel. The valve has a pair of axially spaced inlets in flow communication with a chamber; the chamber, in turn, is in fluid communication with a consumer for the pressurized fluid and flow. Pressure in the chamber or flow through the chamber is varied by an oscillating valve member which is movable to a first position which closes one inlet and opens the other and movable to a second position which opens the other inlet and closes the first inlet. The valve is solenoid operated and includes a valve member which acts as the solenoid armature. The solenoid armature is disposed entirely within the control chamber.

Another example of a high frequency valve is shown in U.S. Pat. No. 3,661,183 entitled Electromagnetically Operated Valve With Two Seats issued to Komaroff et al. In this valve, a valve member is disposed in a control chamber between two seats. Movement of the valve member results (in one direction) from a force exerted by an armature. The armature extends into the control chamber and is pressed against the valve member by a spring. Thus, the spring holds the valve member against one seat. The armature is retracted to a disengaged position from the valve member by a solenoid to allow fluid pressure to float the valve member to the other seat. As does the valve shown in U.S. Pat. No. 4,005,733, operation of this valve depends upon the pressure of the fluid at one port urging the valve member into engagement with the opposing valve seat.

The above art notwithstanding, scientists and engineers are seeking to develop a valve assembly which is operable at high frequency either mechanically or electromagnetically between two opposed seats and which is adapted to provide a variable pressure from a control chamber.

DISCLOSURE OF INVENTION

According to the present invention, a high frequency control valve employing a variable duty cycle has two valve seats spaced axially to leave a control chamber therebetween and has an armature having both a poppet disposed between the seats and a plunger spaced axially from the control chamber which is integrally joined to the poppet.

In accordance with one embodiment, the valve assembly includes an electromagnetic device to move the armature in a first direction and a conical spring which urges the armature in a second direction such that the poppet oscillates between the two seats.

A primary feature of the present invention is a valve assembly having a housing disposed about an axis Am. The housing includes a pair of axially opposed valve seats. The valve seats are spaced axially one from the other to define a control chamber within the housing. A supply port and an exhaust port are in fluid communication through the seats with the control chamber. A control port is in fluid communication with the control chamber. Another feature is an axially extending armature. The armature has a poppet disposed in the control chamber. The poppet is adapted to engage the two control seats to interrupt fluid communication between the port and the control chamber. Another feature of the armature is a plunger spaced axially from the control chamber. The plunger is integrally joined to the poppet. In one embodiment, the poppet is tapered toward the first seat and the second seat. A coil extends circumferentially about the armature to form a solenoid. A conical spring extends between the housing and the armature. The armature has a spherical zone. A spring guide engages the spring and has a frustoconical section that engages the spherical zone of the armature. The plunger of the armature is spaced from the housing leaving an axial gap therebetween which is greater than the movement of the poppet between the two seats. The housing has concentrations of magnetizable material spaced away from the axial gap by nearly equal distances. The plunger is radially spaced from the housing leaving between the housing and the armature a first radial gap for a first axial length of the armature and a second radial gap which is smaller than the first radial gap over a second axial length of the armature.

A primary advantage of the present invention is the power required to operate the valve and the mechanical response time which results from balancing the forces acting on the armature as the armature travels between positions at which the poppet engages first one seat and then the other seat. In particular, the stability of the poppet in the radial direction is improved by positively driving the poppet as a part of the armature in the axial direction between the seats which causes the inertia force of the armature to resist movement of the poppet in the radial direction. In one embodiment, stability is increased by the tapered configuration of the poppet and the aerodynamic interaction of the poppet with the fluid supplied to the control chamber. Stability is enhanced by the conical spring which resists radial movement of the poppet. Stability is further enhanced through balancing the forces exerted by the spring on the armature in the axial direction. Another advantage is the reduction in power which results from spacing the end of the plunger from the housing as compared with devices which do not space the armature from the housing to reduce the effect that induced residual magnetism in the housing has on the free movement of the armature; which do not place the axial gap nearly midway between the magnetizable material of the housing to concentrate the lines of magnetic flux in the armature.

Other features and advantages will be apparent from the specification and claims and from the accompanying drawings which illustrate an embodiment of the invention.

BEST MODE FOR CARRYING OUT THE INVENTION

Figure 1:
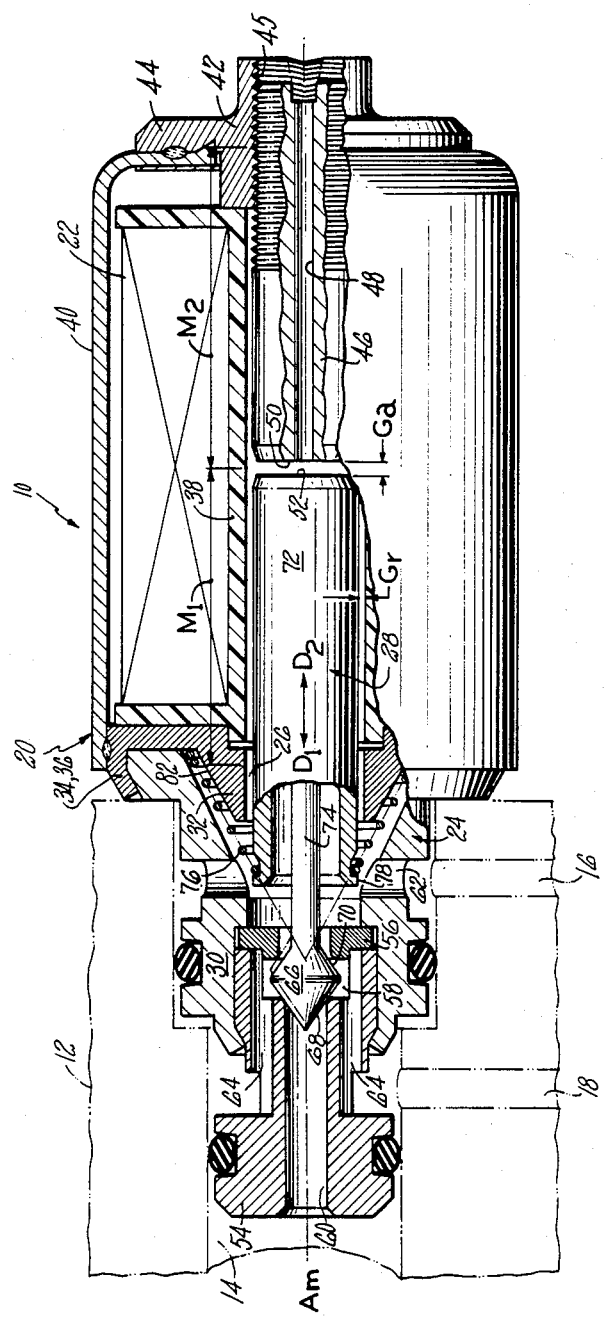
FIG. 1 is a side elevation view of a control valve assembly with a portion of the valve broken away and sectioned.

FIG. 1 is a side elevation view of a control valve assembly 10 disposed about an axis Am with a portion of the interior broken away and sectioned. A portion of the environment of the valve assembly, such as a block 12 of an automobile, is shown in phantom. The block includes a source of pressurized fluid, such as the supply passage 14 in fluid communication with a pump, for supplying the pressurized fluid to the control valve assembly. The block includes a region, such as the sump passage 16, which is in fluid communication with a reservoir. The sump passage is at a pressure lower than the pressure of the fluid in the supply passage. A control passage 18 places the control valve assembly in fluid communication with a device (not shown) requiring a flow of fluid at a pressure which varies with time.

The control valve assembly 10 includes a valve body 20 and an electromagnetic coil 22 which extends circumferentially about the valve body. The valve body has a housing 24 having a cavity 26. An armature 28 is disposed in the cavity. The armature is slidable in the housing along the axis Am of the valve assembly. The armature is shown as an element of an electromagnetic device and might equally be an element of a mechanically operated valve in which the armature is driven by mechanical means at a high frequency.

The housing 24 has a cage 30 which extends circumferentially about the axis Am. The cage adapts the housing 24 to engage the block 12. A first mass of magnetizable material, such as an adaptor 32, extends circumferentially about the axis Am. The adaptor is integrally joined to the cage by a fastening means 34, such as a tang 36 on the adaptor which is bent over the cage or a plurality of screws (not shown). A bobbin 38 extends circumferentially about the axis Am and engages the adaptor. The bobbin is formed of plastic, such as ULTM 2300, a polyetherimide resin fiberglass plastic available from the General Electric Corporation, and adapts the housing to receive the wires of the electromagnetic coil 22. A shell 40 extends circumferentially about the exterior of the housing. The shell protects the coil from the environment and conducts magnetic flux in a closed magnetic circuit. A second mass of magnetizable material, such as having nut 42 having a tang 44, is integrally joined to the shell. The nut has a threaded hole 45 in the center of the nut. A pole piece 46 extends circumferentially about the axis Am and threadably engages the nut. The pole piece has a passage 48 which extends axially in the pole piece. The passage is in fluid communication with the exterior of the housing and thence with the sump reservoir of the block. The pole piece has an end 50. The armature has an end 52 which is spaced from the end 50 of the pole piece leaving an axial gap Ga therebetween. The gap Ga is midway between the first mass of magnetizable material, adaptor 32, and the second mass of magnetizable material, nut 42. The gap Ga is spaced a distance $M_1$ from the first mass and a distance $M_2$ from the second mass.

The housing further includes a first seat, such as a control seat 54, disposed in the cavity 26 of the housing. A second seat, such as an exhaust seat 56, is spaced axially from the control seat leaving a control chamber 58 therebetween. A first port, such as a supply port 60, is in fluid communication with the supply passage 14. The supply port is in fluid communication through the control seat with the control chamber. A second port, such as the exhaust port 62, is in fluid communication with the sump passage 16. The exhaust port is in fluid communication through the exhaust seat with the control chamber. A third port, such as the control port 64, is in direct fluid communication with the control passage 18 and is in fluid communication with the control chamber.

The armature 28 extends axially and circumferentially about the axis Am. The armature is capable of movement parallel to the axis Am in a first direction $D_1$ to a first position in which the armature engages the control seat 54. As shown by the broken lines, the armature is capable of movement in a second direction $D_2$ to a second position in which the armature engages the exhaust seat 56. The armature has a poppet 66 which is disposed in the control chamber and which is adapted by a first frustoconical surface 68 to engage the control seat and is adapted by a second frustoconical surface 70 facing in the second direction to engage the exhaust seat. The armature has a plunger 72 spaced axially from the poppet which is disposed in the cavity 26 and adjacent to the electromagnetic coil. A shaft 74 extends axially to integrally join the poppet to the plunger. The plunger is spaced radially from the bobbin leaving a radial gap Gr therebetween. The gap Ga between the armature and the pole piece 46 is in fluid communication with the fluid as it leaves the exhaust seat of the valve flowing to the sump passage 16 and thence to the sump reservoir. The sump reservoir (not shown) gathers the fluid for disposal or for return to the supply side of the control valve assembly.

A means for urging the poppet in the first direction, such as the spring 76, extends between the housing 24 and the armature 28. The armature is adapted by a circumferentially extending shoulder 78 to engage the spring. The adaptor 32 has a conical surface 82 inwardly of the spring. The spring has a tapered cross section of conical shape as shown by the broken lines which connect the center of the coils of the spring. This type of spring is referred to as a conical spring. Other tapered springs, such as a volute spring, or other nontapered springs may be utilized.

Figure 2:
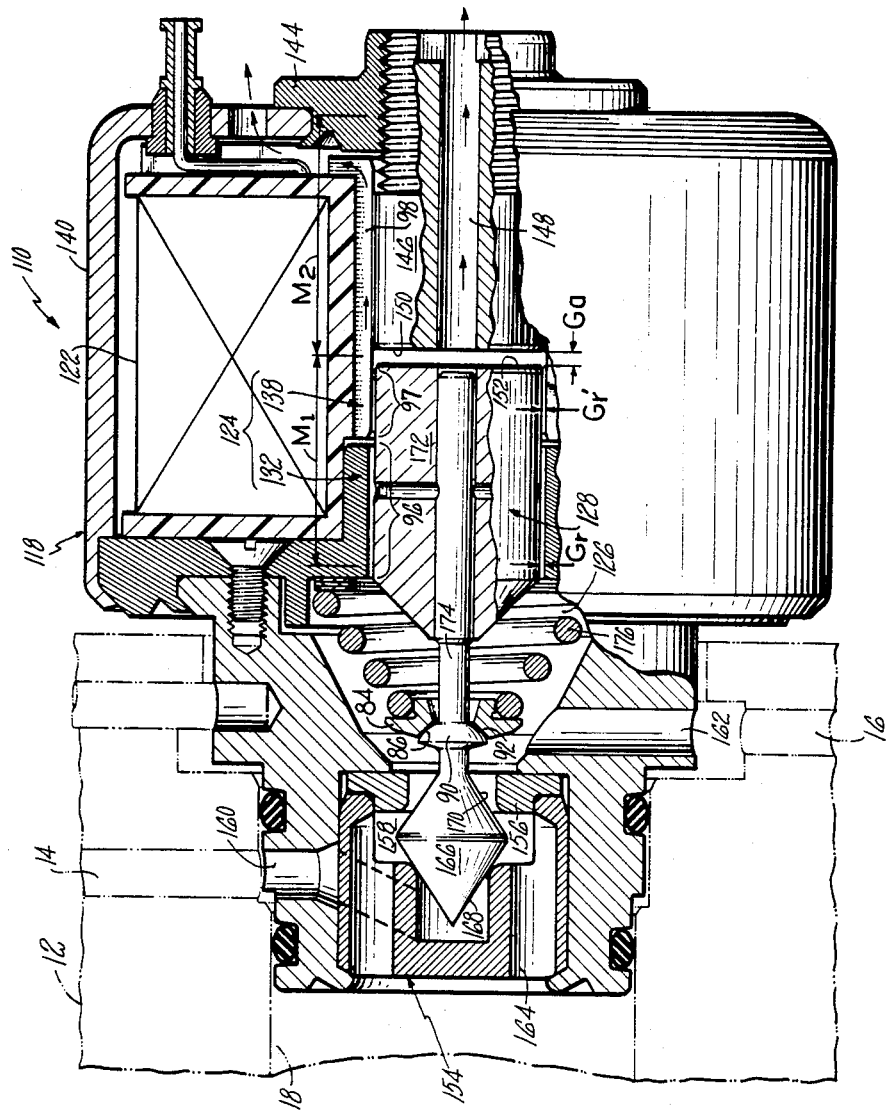
FIG. 2 is a side elevation view of an alternate embodiment of the control valve assembly shown in FIG. 1.
Figure 3:
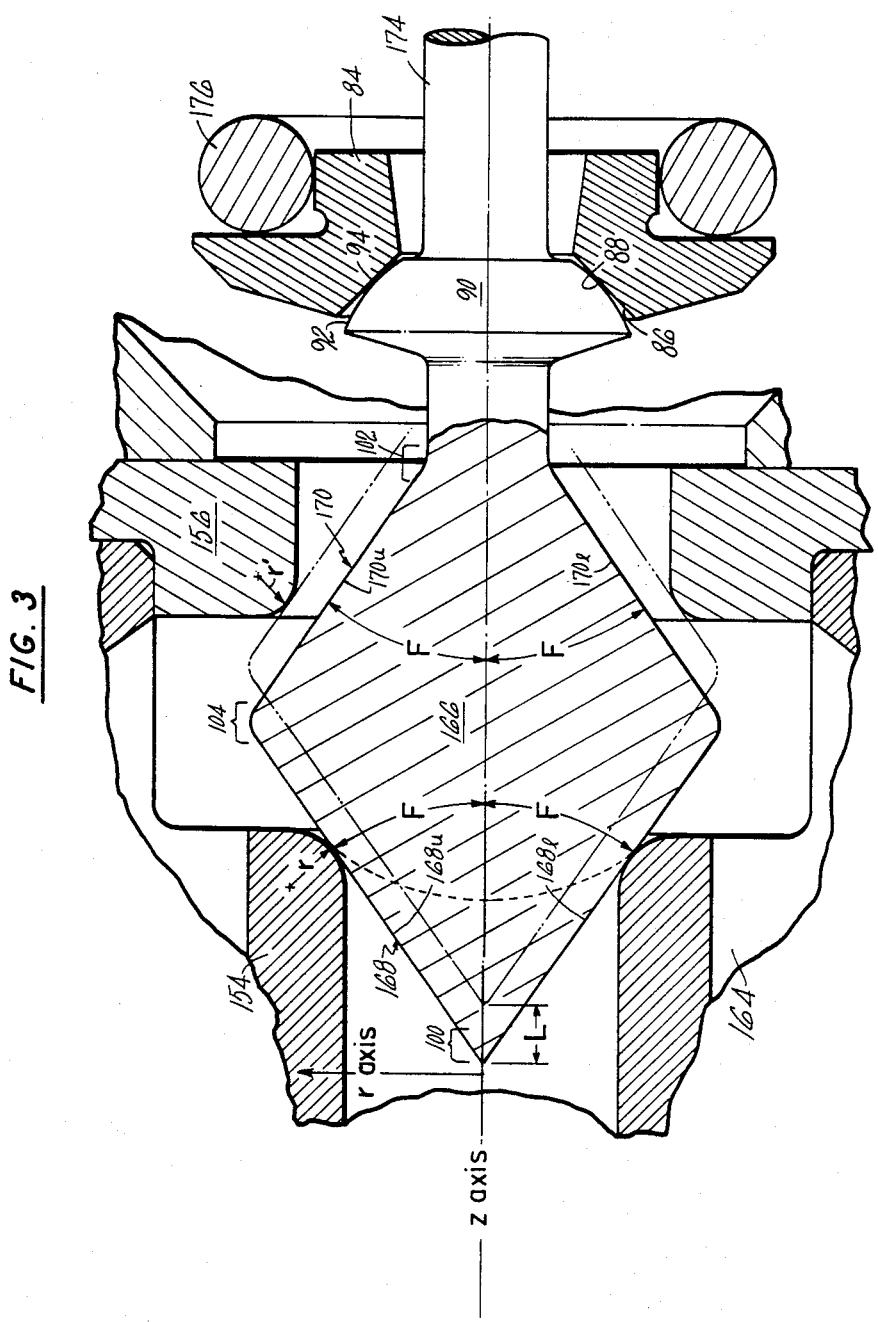
FIG. 3 is an enlarged view partly in section and partly in full of a portion of the control valve assembly shown in FIG. 2.

FIG. 2 is an alternate embodiment 110 of the control valve assembly shown in FIG. 1 having a means for urging the poppet in the first direction which includes a spring guide 84. As shown more fully in FIG. 3, the spring guide has a concave surface 86 facing in the first direction. The concave surface has a frustoconical portion 88 which adapts the spring guide to engage the shaft 174 extending between the plunger 172 and the poppet 166. As in the FIG. 1 embodiment, the shaft integrally joins the poppet to the plunger and has a collar 90 which extends circumferentially about the shaft. As shown in FIG. 2 and FIG. 3, the collar has a convex surface 92 at least a portion of which is a spherical zone 94. The spherical zone faces in the second direction and engages the spring guide in a ball joint type engagement.

A conical spring 176 extends between the spring guide and the housing to urge the plunger in the first direction. As with the conical spring 76, the conical spring 176 has a free length which is greater than the installed length.

The plunger 172 of the armature 128 which is disposed in the cavity 126 has a first axially extending portion 96 spaced radially from the housing 124 leaving a radial gap Gr therebetween. The armature also has a second axially extending portion 97 spaced radially from the bobbin 138 of the housing leaving a second radial gap Gr' therebetween which is smaller than the radial gap Gr. As with the embodiment shown in FIG. 1, the armature has an end 152 spaced axially from the pole piece 146 of the housing leaving a gap Ga therebetween. In addition to the passage 148 in the pole piece, the bobbin of the housing has four circumferentially spaced passages, as represented by the passage 98, which extend axially from the axial gap Ga to the exterior of the housing.

FIG. 3 is an enlarged view of the embodiment shown in FIG. 2 showing the poppet 166 and adjacent structure which includes the annular exhaust seat 156, the annular control seat 154, the spring guide 184 and the collar 190 on the shaft. As shown by the broken lines, the poppet moves a distance L from the control seat to the exhaust seat to engage the exhaust seat. The maximum axial gap Ga between the plunger and the pole piece is greater than the length L but less than twice the length L, ($L < Ga < 2L$). As will be realized, the tapered shape of the poppet might result from a poppet having a circular cross section rather than having the frustoconical shape as shown.

The poppet 166 has a tip region 100, a base region 102 and a transition region 104 disposed between the tip region and the base region. The first surface 168 extends between the tip region and the transition region and is tapered toward the tip region. The second surface 170 extends between the transition region and the base region and the is tapered towards the base region. As can be seen, the first surface has a first upper side $168_u$ and a first lower side $168_l$. The second surface has a second upper side $170_u$ and a second lower side $170_l$. A reference z-axis is coincident with the axis Am. In the tip region, a reference r-axis is perpendicular to the reference z-axis. The first upper side has a positive slope ($dr/dz > 0$), the second upper side has a negative slope ($dr/dz < 0$) and neither side has an inflection point. The absolute value of the slope of both sides lies in a range of twenty-six hundredths (0.26) to one hundred and nineteen hundredths (1.19). The first lower side and second lower side are mirror images of the first upper side and the second upper side. The first surface and the second surface are frustoconical in the region where the surfaces engage the control seats. The tip region is a conical surface which is coincident with the first surface. The included angle F between each frustoconical surface and the z-axis lies in a range of fifteen degrees to fifty degrees ($15° < F < 50°$).

During operation of the control valve assembly 10 shown in FIG. 1, a pressurized fluid is supplied via the supply passage 14 to the supply port 60.

Electrical energy is supplied to the coil 22. The coil in combination with the pole piece 46 and the armature 28 forms a solenoid. An electromagnetic force results from the electrical energy. The force is exerted on the plunger 72 causing the plunger to overcome the force exerted by the spring 76. The plunger causes the armature to move from the first position towards the second position. As the valve moves from the first position, where it engages the control seat 54, to the second position, where it engages the exhaust seat 56, the pressurized fluid enters the control chamber 58 causing the pressure of the control chamber to increase.

The pressure in the control chamber 58 continues to rise until the solenoid is de-energized and the spring force exerted by the spring overcomes the magnetic force exerted by the electromagnetic field associated with the solenoid and the hydraulic drag and inertial forces associated with the armature. The plunger 28 begins to move from the second position to the first position, placing the control chamber in fluid communication through the exhaust seat with the exhaust chamber. Because the exhaust chamber is at a pressure lower than the pressure in the supply chamber, the pressure in the control chamber begins to drop. The pressure in the control chamber is transmitted via the control port 64 and control passage 18 to a device requiring the control pressure.

The armature 28 of the control valve is reciprocated at a high frequency, (that is, many cycles each second) so that the pressure available from the control chamber does not fluctuate widely.

In fact, for the valve shown, the valve operates at a minimum frequency of twenty (20) cycles per second with a maximum frequency of operation that exceeds a hundred (100) cycles per second.

The pressure in the control chamber is a function of the duty cycle. The duty cycle at a particular seat is the ratio of the period of time at that seat to the period of time for the plunger to leave that seat and return to the seat during one cycle of operation. The duty cycle sets the pressure within the average chamber at some value between the supply pressure and the sump pressure. Were the plunger to remain in the first position at all times, the pressure would equal the sump pressure. Were the plunger to remain in the second position at all times against the exhaust seat, the pressure in the control chamber would equal the supply pressure.

As the poppet cruises from one seat to the other in the control chamber, it is important that the poppet exhibit good stability in the radial direction. The stability of the poppet is improved by positively driving the poppet in the axial direction between the seats with the plunger as an integral portion of the armature. The inertia force of the armature (rate of change of momentum) moving in the axial direction resists movement of the poppet in the radial direction which might result from fluctuations in radial forces acting on the plunger. These radial forces primarily result from hydraulic forces, variations in fluid pressure within the control chamber, and momentum forces linked to the change in momentum of the fluid as the fluid flows through the chamber, changing in both direction and speed.

While the complex interaction of forces between the poppet of the armature and the fluid in the chamber is not a well understood phenomenon, one of the most stable constructions is believed to be a poppet having tapered surfaces which face each of the seats. The angle of the surface with respect to the z-axis lies in a range of from fifteen degrees to fifty degrees ($15° < F < 50°$). As the angle F becomes smaller and smaller, the length L of the plunger stroke increases. Because of the greater length to move the armature the required distance between the first position and the second position, the operating frequency of the valve is adversely affected. As the angle F becomes larger and larger, the hydraulic drag increases, increasing the amount of spring force needed to move the plunger from the second position to the first position and, increasing the amount of electromagnetic force needed to move the plunger from the first position to the second position. A poppet, such as the spherical poppet shown by the broken lines might be used, for example, where concerns of drag force are not as great as concerns for the amount of distance that the armature must move.

The air gap Ga is spaced a nearly equal distance between the first mass of magnetizable material, adapter 32, and the second mass of magnetizable material, nut 42, for concentrating the lines of flux acting through the pole piece and the armature to most efficiently use the power utilized by the solenoid. Ideally, the air gap Ga is located at the point where the magnetic flux density is at its greatest value and causes the greatest force to act on the armature. Theoretically, for identical masses of the same magnetizable material, this point is exactly half the total distance between the masses of magnetizable material. As shown in FIG. 1, the distance $M_1$ is nearly equal to the distance $M_2$. Ideally, the maximum air gap would be a minimum clearance equal to the length of the stroke L to utilize the magnetic force to a maximum. However, residual magnetism induced in the pole piece restrains the plunger as the plunger moves in response to the spring force from the second position to the first position. Accordingly, a small gap is provided to decrease the effect that this residual magnetism has on movement of the plunger. It is believed that an axial gap Ga which is greater than the stroke length L but less than twice the stroke length L is suitable to balance these concerns. If residual magnetism is not a concern, the maximum air gap Ga may grow very small and approach the value of L, the stroke length of the poppet.

Operation of the alternate embodiment shown in FIG. 2 is similar to the operation of the embodiment shown in FIG. 1. The alternate embodiment is provided with the spring guide 84 and collar 90 on the shaft to accommodate tolerance variations in the conical spring. As a result of these tolerance variations, the coil engaging the spring guide is often not in the same plane as the coil of the spring which engages the housing. This causes the spring to exert a slightly uneven force in the axial direction on the spring guide. The spring guide acts as a ball joint, shifting on the spherical zone as it seeks to balance the axial forces acting on the spring guide and thus on the armature thereby reducing the unbalanced couple of forces which exerts a moment force pushing the armature and the poppet in the radial direction.

In the control chamber, the annular exhaust seat and the annular control seat are contoured with a spherical zone (respectively of a radius r, r' with r>r') to provide line-to-line contact between the poppet and the seats.

The radial gap Gr between the plunger and the housing is reduced adjacent to the plastic bobbin to provide a more certain axial guide to the plunger than is provided by the radial gap Gr. Lubricating fluid is provided to both gaps by ducting a portion of the fluid from the exhaust chamber through the radial gaps to the air gap Ga. The air gap Ga is in fluid communication with the four equally spaced grooves which extend in the bobbin to the exterior of the housing to provide positive lubrication to the plunger as the plunger reciprocates and yet to reduce the resistance to movement of the plunger which might result from the flow of the lubricating fluid to and away from the gap Ga between the plunger and the pole piece as the armature oscillates between the first position and the second position.

Although this invention has been shown and described with respect to detailed embodiments thereof, it will be understood that various modifications in form and detail will suggest themselves to those skilled in the art, and it is intended by the appended claims to cover such modifications as come within the true spirit and scope of this invention.

What is claimed is:

1. A control valve assembly of the type adapted to be operated at a high frequency with a variable duty cycle, the valve having an axis Am, which comprises:
  a housing having a cavity which extends axially within the housing, the housing further having
    a first seat disposed in the cavity,
    a second seat disposed in the cavity and spaced axially from the first seat leaving a control chamber therebetween,
    a first port which adapts the valve assembly to be in fluid communication with a fluid at a first pressure, and which is in fluid communication through one of said seats with the control chamber,
    a second port which adapts the valve assembly to be in fluid communication with a region having a fluid at a second pressure which is not equal to the first pressure, and which is in fluid communication through the second seat with the control chamber,
    a third port which is in fluid communication with the control chamber;
  an integral armature extending axially about the axis Am which is movable in a first direction to a first position and movable in a second direction to a second position, the armature having
    a poppet disposed in the control chamber which is adapted to engage the first seat at the first position of the armature and to engage the second seat at the second position of the armature,
    a plunger disposed in the cavity which is spaced axially from the poppet and which is spaced radially from the housing leaving a clearance gap Gr therebetween, and having an end spaced axially from the housing leaving an axial gap therebetween,
    a shaft which extends axially from the plunger to the poppet through one of said seats to join the poppet to the plunger;
  a first means for urging the poppet in one of said directions to engage one of said seats; and
  a coil extending circumferentially about at least a portion of the plunger for urging the poppet in the other of said directions to engage the other of said seats;
  wherein forces exerted on the armature are transmitted to the poppet to move the poppet at high frequencies from the first seat to the second seat and from the second seat to the first seat to establish an average pressure in the control chamber which is a function of the time spent at each seat and between the seats, and wherein the inertia of the plunger acts to resist movement of the poppet in the radial direction in response to fluid forces acting on the poppet as the poppet moves between the seats.

2. The high frequency valve of claim 1 wherein the first seat is a control seat, the second seat is an exhaust seat, the first port is a supply port, the second port is an exhaust port and the third port is a control port.

3. The high frequency valve of claim 1 wherein the poppet has a tip region, a base region and a transition region disposed between the tip region and the base region, wherein a first surface extends between the tip region and the transition region and a second surface extends between the transition region and the base region, the first surface being tapered toward the tip region and the second surface being tapered toward the base region.

4. The high frequency valve of claim 3 wherein the poppet has a cross-sectional shape and wherein the first surface has a first upper side and a first lower side, the second surface has a second upper side and a second lower side, wherein a reference z-axis is coincident with the axis Am of the valve assembly and a reference r-axis is perpendicular to the reference z-axis in the tip region and wherein the first upper side has a positive slope ($dr/dz > 0$) the second upper side has a negative slope ($dr/dz < 0$) and neither side has an inflection point.

5. The high frequency valve of claim 4 wherein the absolute value of the slope $dr/dz$ lies in a range of twenty-six hundredths of one-hundred and nineteen hundredths ($0.26 \leq |dr/dz| \leq 1.19$).

6. The high frequency valve of claim 3 wherein the first surface and the second surface are frustoconical and wherein the tip region is a conical surface which is coincident with the second surface.

7. The high frequency valve of claim 6 wherein the included angle F between the frustoconical surfaces and z-axis lies in a range of fifteen degrees to fifty degrees ($15° \leq F \leq 50°$).

8. The invention as claimed in claim 7 wherein an exhaust chamber is in fluid communication with the second port and the control chamber and wherein the gap between the armature and the housing is a gap Ga, wherein the distance between the first position and the second position is a length L and wherein the gap Ga is greater than the distance L and less than a distance which is twice the distance L, ($L < Ga < 2L$), the gap Ga being in fluid communication with the exterior of the housing and the exhaust chamber to provide lubrication to the armature and to drain the gap Ga during movement of the armature.

9. The invention as claimed in claim 1, 2, 3, 4, 5, 6, 7, or 8 wherein the means for urging the poppet in the first direction is a resilient member.

10. The invention as claimed in claim 9 wherein the resilient member is a spring.

11. The invention as claimed in claim 10 wherein the spring is formed of a plurality of coils and has a cross-sectional shape which is tapered.

12. The invention as claimed in claim 11 wherein the spring has a cross-sectional shape that is conical.

13. The invention as claimed in claim 11 wherein the armature has a circumferentially extending convex surface at least a portion of which is a spherical zone which faces in the second direction and wherein the means for urging the poppet in the first direction includes a spring guide having a shoulder that engages a coil of the spring and having a concave surface facing in the first direction that engages the spherical zone.

14. An electromagnetically operated valve assembly having an axis Am which comprises:
a housing having a cavity which extends axially within the housing, the housing further having
   a control seat disposed in the cavity,
   an exhaust seat spaced axially from the control seat leaving a control chamber therebetween,
   a supply port in fluid communication through the control seat with the control chamber,
   an exhaust port in fluid communication through the exhaust seat with the control chamber,
   a control port in fluid communication with the control chamber, and
   at least one passage extending axially in the housing adjacent to the cavity to place the cavity in fluid communication with the exterior of the housing;
an armature extending axially about the axis Am which is capable of movement parallel to the axis in a first direction to a first position and in a second direction to a second position, the first position being spaced from the second position by a distance L;
a poppet disposed in the control chamber, the poppet having a first frustoconical surface facing in the first direction which adapts the poppet to engage the control seat and having a second frustoconical surface facing in the second direction which adapts the poppet to engage the exhaust seat;
a plunger spaced axially from the poppet which is disposed in the cavity, the plunger having
   a first axially extending portion spaced radially from the housing leaving a radial gap Gr therebetween,
   a second axially extending portion spaced radially from the housing leaving a second radial G$\acute{r}$ therebetween which is smaller than the radial gap Gr, (G$\acute{r}$ < Gr), and
   an end spaced axially from the housing leaving a gap Ga therebetween which is greater than the distance L, the gap Ga being in fluid communication with the exterior of the housing through said passage in the housing;
a shaft extending axially from the plunger to the poppet which integrally joins the poppet to the plunger, the shaft having a collar which extends circumferentially about the shaft, the collar having a convex surface at least a portion of which is a spherical zone which faces in the second direction;
a means for urging the poppet in the first direction which includes
   a spring guide having a concave surface facing in the first direction which has a frustoconical portion which engages the spherical zone of the collar, and
   a conical spring extending circumferentially about the shaft which is trapped between the housing and the spring guide, the conical spring having an installed length and a free length, the free length being greater than the installed length;
an electromagnetic coil disposed within the housing which extends circumferentially about said plunger.

15. The electromagnetically operated valve assembly of claim 14 wherein the housing includes a first mass of magnetizable material and a second mass of magnetizable material disposed circumferentially about the axis Am, the first mass being spaced from the gap Ga by a first distance $M_1$ and the second mass being spaced from the gap Ga by a second distance $M_2$ such that the gap Ga is disposed about the axis Am midway between the first mass and the second mass.

16. A valve body of the type adapted to be operated at a high frequency with a variable duty cycle, the valve body having an axis Am, which comprises:
a housing having a cavity which extends axially within the housing, the housing further having
   a first seat disposed in the cavity,
   a second seat disposed in the cavity and spaced axially from the first seat leaving a control chamber therebetween,
   a first port which adapts the valve assembly to be in fluid communication with a fluid at a first pressure, and which is in fluid communication through one of said seats with the control chamber, a second port which adapts the valve assembly to be in fluid communication with a region having a fluid at a second pressure which is not equal to the first pressure, and which is in fluid communication through the second seat with the control chamber, a third port which is in fluid communication with the control chamber;

an integral armature extending axially about the axis Am which is movable in a first direction to a first position and movable in a second direction to a second position, the armature having a poppet disposed in the control chamber which is adapted to engage the first seat at the first position of the armature and to engage the second seat at the second position of the armature, a plunger disposed in the cavity which is spaced axially from the poppet and which is spaced radially from the housing leaving a clearance gap Gr therebetween, and having an end spaced axially from the housing leaving an axial gap therebetween, a shaft which extends axially from the plunger to the poppet through one of said seats to join the poppet to the plunger; and a first means for urging the poppet in one of said directions to engage one of said seats.

17. A valve body of the type adapted to be operated at a high frequency having an axis Am, which comprises:

a housing having a cavity which extends axially within the housing, the housing further having a control seat disposed in the cavity, an exhaust seat spaced axially from the control seat leaving a control chamber therebetween, a supply port in fluid communication through the control seat with the control chamber, an exhaust port in fluid communication through the exhaust seat with the control chamber, a control port in fluid communication with the control chamber, and at least one passage extending axially in the housing adjacent to the cavity to place the cavity in fluid communication with the exterior of the housing;

an armature extending axially about the axis Am which is capable of movement parallel to the axis in a first direction to a first position and in a second direction to a second position, the first position being spaced from the second position by a distance L;

a poppet disposed in the control chamber, the poppet having a first frustoconical surface facing in the first direction which adapts the poppet to engage the control seat and having a second frustoconical surface facing in the second direction which adapts the poppet to engage the exhaust seat;

a plunger spaced axially from the poppet which is disposed in the cavity, the plunger having a first axially extending portion spaced radially from the housing leaving a radial gap Gr therebetween, a second axially extending portion spaced radially from the housing leaving a second radial $Gr_1$ therebetween which is smaller than the radial gap Gr, ($Gr < Gr_1$), and an end spaced axially from the housing leaving a gap Ga therebetween which is greater than the distance L, the gap Ga being in fluid communication with the exterior of the housing through said passage in the housing;

a shaft extending axially from the plunger to the poppet which integrally joins the poppet to the plunger, the shaft having a collar which extends circumferentially about the shaft, the collar having a convex surface at least a portion of which is a spherical zone which faces in the second direction;

a means for urging the poppet in the first direction which includes a spring guide having a concave surface facing in the first direction which has a frustoconical portion which engages the spherical zone of the collar, and a conical spring extending circumferentially about the shaft which is trapped between the housing and the spring guide, the conical spring having an installed length and a free length, the free length being greater than the installed length.

* * * * *